United States Patent
Hundemer (10) Patent No.: US 9,495,472 B1
(45) Date of Patent: *Nov. 15, 2016

(54) SYSTEMS AND METHODS FOR NEWSROOM MANAGEMENT WITH ELECTRONIC-PUBLISH-POINT INTEGRATION

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/150,651

(22) Filed: May 10, 2016

Related U.S. Application Data (63) Continuation of application No. 13/724,997, filed on Dec. 21, 2012, now Pat. No. 9,360,983.

(60) Provisional application No. 61/579,491, filed on Dec. 22, 2011.

(51) Int. Cl.
*G06F 3/0481* (2013.01)
*G06F 17/30* (2006.01)
*G06F 3/0484* (2013.01)
*G06F 17/24* (2006.01)

(52) U.S. Cl.
CPC ....... *G06F 17/3089* (2013.01); *G06F 3/04842* (2013.01); *G06F 17/24* (2013.01); *G06F 17/30038* (2013.01)

(58) Field of Classification Search
None
See application file for complete search history.

(56) References Cited

U.S. PATENT DOCUMENTS

| | | | |
|---|---|---|---|
| 5,852,435 A | 12/1998 | Vigneaux et al. | |
| 6,141,007 A * | 10/2000 | Lebling | G06F 17/30716 707/E17.093 |
| 2002/0080161 A1* | 6/2002 | St. Maurice | H04N 7/163 715/719 |
| 2004/0008220 A1* | 1/2004 | Snyder | G06F 3/0481 715/716 |
| 2005/0166257 A1* | 7/2005 | Feinleib | H04N 7/163 725/136 |
| 2007/0220555 A1* | 9/2007 | Espelien | H04L 29/06027 725/46 |

(Continued)

*Primary Examiner* — Phenuel Salomon
(74) *Attorney, Agent, or Firm* — McDonnell Boehnen Hulbert & Berghoff LLP (57) ABSTRACT

Presently described are systems and methods for newsroom management with electronic-publish-point integration. One example embodiment takes the form of a non-transitory computer-readable medium containing instructions that, when executed by a processor, cause a set of steps to be carried out for submitting content to an electronic publish point. The set of steps includes providing a newsroom script to a user via a user interface; receiving a selected portion of an on-air text portion of the newsroom script from the user via the user interface; and retrieving, from a media database, media associated with the newsroom script. The set of steps further includes submitting content to the publish point, wherein the content includes text associated with the selected portion of the on-air text portion, and wherein the content further includes the retrieved media.

20 Claims, 5 Drawing Sheets

(56) References Cited

U.S. PATENT DOCUMENTS

| | | | |
|---|---|---|---|
| 2007/0276726 A1* | 11/2007 | DiMatteo | G06Q 30/02 705/14.66 |
| 2007/0288518 A1* | 12/2007 | Crigler | G06F 17/30038 |
| 2008/0083003 A1* | 4/2008 | Biniak | G11B 27/28 725/110 |
| 2008/0189617 A1* | 8/2008 | Covell | G06F 17/3089 715/738 |
| 2010/0008220 A1 | 1/2010 | Le Roux et al. | |
| 2012/0226818 A1* | 9/2012 | Atas | G06F 17/30079 709/238 |
| 2013/0080895 A1* | 3/2013 | Rossman | G06F 3/04883 715/720 |

* cited by examiner

SYSTEMS AND METHODS FOR NEWSROOM MANAGEMENT WITH ELECTRONIC-PUBLISH-POINT INTEGRATION

RELATED DISCLOSURE

This disclosure is a continuation of U.S. patent application Ser. No. 13/724,997, entitled "Systems and Methods for Newsroom Management with Electronic-Publish-Point Integration" and filed on Dec. 21, 2012, which claims priority to U.S. Provisional Pat. App. No. 61/579,491, entitled "System and Method for Newsroom Production" and filed on Dec. 22, 2011, the entire contents of each of which is incorporated by reference herein.

USAGE AND TERMINOLOGY

Throughout this application, with respect to all reasonable derivatives of such terms, and unless otherwise specified (and/or unless the particular context clearly dictates otherwise), each usage of:

"a" or "an" is meant to be read as "at least one";
"the" is meant to be read as "the at least one";
"includes" is meant to be read as "includes but is not necessarily limited to, necessarily coupled to or with, and/or necessarily integrated with";
the term "publish point" refers broadly to any point and/or destination to which content can be electronically published and then accessed directly or indirectly by one or more users, and explicitly includes such points and/or destinations associated with the various social-media services referenced herein and those social-media services comparable thereto, whether accessible to one or more users via one or more websites, one or more applications (that are provided on, e.g., one or more connected devices), and/or one or more other similar user-interface-based alternatives deemed suitable by those in the art;
the term "submit" (when used in connection with submitting content to a publish point) refers broadly to any step or technique used to send, transfer, and/or copy content to one or more publish points, which notably often promote self-adopted and/or alternative terminology (e.g., post, Tweet®, share, and the like) to describe this concept;
the term "producer" refers broadly to any producer, newsroom social-media director, newswriter, and/or otherwise-designated user who is assigned to and/or involved with creating and/or submitting content to one or more publish points;
the term "connected device" refers broadly to any device (or combination of devices) that is capable of providing visual output and that is configured to be connected to at least one other device for transferring data (e.g., via the Internet), some representative examples of which include desktop and laptop computers, tablets, mobile phones, or other mobile devices, e-book readers, televisions, monitors, electronic billboards, and the like;
the term "content" refers broadly to any portion or any combination of text and/or media (such as graphics, images, audio, and/or video);
the term "video" refers broadly to any material represented in any one or more video formats, which are typically organized according to a scheme of multiple sequential frames, and which may or may not include or be otherwise associated with one or more corresponding audio portions; and
the term "video component" refers to video that one of skill in the art would typically consider to be self-contained (i.e., that would be separately scheduled and sequenced by a scheduling-and-sequencing system (or perhaps a newsroom-management system) in a typical broadcasting environment), and that may in some instances include a video portion (e.g., of a final produced news program) that is recorded while being produced.

TECHNICAL FIELD

The present systems and methods relate to broadcasting technology and more particularly to newsroom management and to the creation and submission of content to one or more electronic publish points.

BACKGROUND

Full service broadcasting systems typically include a series of subsystems that communicate through use of a widely accepted protocol, namely the Video Disk Control Protocol ("VDCP") or the Media Object Server ("MOS") protocol. One such subsystem is a video-recording-and-playout server, a common example of which is the K2 server provided by Grass Valley™ of San Francisco, Calif. Another subsystem is a video-management system such as Bitcentral of Newport Beach, Calif., which manages a plurality of video-recording-and-playout servers by organizing and moving video components back and forth between the servers and a video-component database (i.e., to store a video component once it is recorded, or to retrieve a video component for playback). Video-recording-and-playout servers typically communicate with video-management systems using the VDCP protocol.

Another subsystem is a newsroom-management system, which joins previously recorded video components (that were, e.g., retrieved by a video-management system) with live video components, graphics, voiceovers, and/or other features or add-ins, to produce a news program. An example of a newsroom-management system is the Essential News Production System, a/k/a the Electronic News Program System ("ENPS"), which is leased for use by stations from the Associated Press ("AP"). Newsroom-management systems typically communicate with video-management systems using the MOS protocol. A news program is then ultimately selected by a scheduling-and-sequencing subsystem for commercial broadcast (on, e.g., a television channel).

With the recent popularity of electronic publish points ("publish points") such as those associated with social media services (e.g., Facebook® (hereinafter "Facebook") and Twitter® (hereinafter "Twitter")), it has become common to publicize and solicit interest in a given news program by creating content that relates to the news program, and submitting that content to an associated publish point. For example, content from or associated with a news program may be used to create and submit content to a Facebook page that is associated with that news program (which is then accessible by a user via a website, application, etc.). That content may also be submitted to other related publish points such as a Facebook page associated with a particular media personality that is affiliated with that news program, a Twitter feed for the station on which the news program is broadcast, and/or one or more other options.

The specific type of content that is submitted to a given publish point typically depends on the configuration of the publish point, but in most instances includes text, hyperlinks, and/or media (such as video components (or embedded code for video players, applications, etc.) and/or images). Certain publish points such as those described above often also provide their users with an ability to respond to a publish-point submission, thereby encouraging and facilitating interactive communication.

Because it is often desired that content that is submitted to publish points be provided to end users in close temporal proximity to the time when associated content becomes available on other types of media (e.g., on-air broadcast, web videos, video players and/or applications on connected devices, and the like), or at least that such submissions have a "real-time" feel, content is typically submitted to publish points around the same time that the associated content becomes available (e.g., is shown) on the other media. For example, in the broadcasting industry, it is particularly important that publish-point content about broadcast-news programming appear in close temporal proximity to when the news program airs on television (i.e., to coincide with a live television broadcast). This is due in part to the fact that the publish-point content is used to drive interest in the news program through other media.

Accordingly, a user (e.g., a producer, newsroom social-media director, an otherwise-designated user (hereinafter, collectively referred to as a "producer")) that is affiliated with the provider of that news program typically creates and manually submits content to various publish points while the news program is being broadcast. However, this approach presents several issues. First, news programs are often fast-paced and loaded with content, making it difficult for the producer to keep up with submitting timely content. This is particularly an issue when a producer is submitting content to multiple publish points (e.g., multiple pages or feeds associated with one or more social-media services) at substantially the same time. Further, news programs are often modified shortly before or even during a broadcast to address timing issues, technical issues, and/or other issues. As such, a producer's ability to create publish-point content in advance of a news program is limited, due in part to the practical realities of the ways in which news programming is created and/or the transient time-sensitive nature of the news content itself.

Another disadvantage of the above-described approach is that the process of creating publish-point content is often tedious and time-consuming. Indeed, in addition to drafting appropriate text (i.e., text that is associated with the content that is broadcast in the news program), the producer often needs to search for and retrieve a relevant video component and then include it in the publish-point content. Obtaining relevant video components in this environment is particularly difficult due to the fact that traditional broadcasting systems have a segmented design.

As described above, prior-art newsroom-management systems are not optimized for tight integration with playout servers and/or video-management systems. As such, when a producer is using such a newsroom-management system (i.e., to view content that is currently being broadcast or scheduled for broadcast on a news program), and decides to create publish-point content that includes a related video component, the producer must leave the newsroom-management-system environment, access a separate video-management system (that has access to a video-component database), and search for and retrieve the appropriate video component. Thereafter, the producer must draft appropriate text, upload the retrieved video component, and submit the content to the appropriate publish point. This approach presents similar issues when producers seek to include other relevant media (e.g., images) in their publish-point content, as such media is similarly not available within (nor easily attainable by) that newsroom-management system.

Due to the complexity and time required in carrying out the above-described approach, it is common for publish-point content created in this environment to be submitted in an untimely fashion and/or to contain errors. For example, the submitted content may include substantive and/or typographical errors in its text, and may also or instead include undesired media (e.g., media that is not relevant to the applicable portion of the news program), mismatched and/or inaccurate media (e.g., media that contains extra content that is not related to the applicable portion of the news program and/or does not contain relevant content that is intended to be emphasized by the publish-point content), and the like.

Yet another problem with the above-described approach is that it may present security issues. In order to enable one or more producers to submit publish-point content, each such person is typically provided with login credentials for a set of predetermined publish points. However, because the list of applicable publish points may be large and may frequently change, it can and often does become difficult to manage these login credentials. As one example, in the event that a producer is terminated or removed from a news program project, the login credentials for all associated publish points must, in order to prevent unauthorized access, then be changed and provided to all other producers who continue to require such access.

SUMMARY

Disclosed herein are systems and methods for newsroom management with electronic-publish-point integration; the disclosed systems and methods improve upon the traditional approaches to creating and submitting content to an electronic publish point in a broadcasting environment.

One example of an advantage of the presently disclosed systems and methods is the ability to quickly and efficiently create publish-point content that is relevant to an associated news program.

Another example of an advantage of the presently disclosed systems and methods is the ability to efficiently and accurately select and edit text based on an associated newsroom script, for inclusion in content submitted to a publish point.

Another example of an advantage of the presently disclosed systems and methods is the ability to efficiently and accurately retrieve and edit media based on an association with a newsroom script used for a news program, for inclusion in content submitted to a publish point.

Another example of an advantage of the presently disclosed systems and methods is the ability to efficiently and accurately retrieve and edit media from one or more e-mails, one or more websites, one or more media databases, and/or any other available source(s), for inclusion in content submitted to a publish point.

Another example of an advantage of the presently disclosed systems and methods is the ability to efficiently and accurately select an image of a video component based at least in part on a selection of newsroom-script text, for inclusion in content submitted to a publish point.

Another example of an advantage of the presently disclosed systems and methods is the ability to store, manage, and retrieve login credentials of publish points to reduce or eliminate security issues often presented when submitting content to a publish point.

Another example of an advantage of the presently disclosed systems and methods is the ability to tag for auto-publishing content that is associated with a newsroom script, to reduce or eliminate user intervention at or around the time the content is intended to be submitted to a publish point.

Various embodiments of the presently disclosed systems and methods may have none, some, or all of these advantages. Other advantages will be readily apparent to one of ordinary skill in the art.

A first example embodiment takes the form of a non-transitory computer-readable medium containing instructions that, when executed by a processor, cause a set of steps to be carried out for submitting content to an electronic publish point. The set includes the steps of (i) providing a newsroom script to a user via a user interface, (ii) receiving a selected portion of an on-air text portion of the newsroom script from the user via the user interface, and (iii) retrieving, from a media database, media associated with the newsroom script. The set further includes the step of submitting content to the publish point, where the content includes text associated with the selected portion of the on-air text portion, and where the content further includes the retrieved media. Another example embodiment takes the form of a method comprising this set of steps.

A second example embodiment takes the form of a newsroom-management system that includes (i) a media database that is configured to store media, (ii) a newsroom-script database that is configured to store newsroom scripts together with references to associated media, (iii) a user interface comprising a display device and an input device, and (iv) a publish-point module that is coupled to the media database, the newsroom-script database, and the user interface. The publish-point module is configured for (i) receiving a user-selected portion of an on-air text portion of a newsroom script, (ii) retrieving, from the media database, media associated with the newsroom script based at least in part on a reference included in the newsroom-script database, and (iii) submitting content to an electronic publish point, the content including text associated with the selected portion of the on-air text and further including the retrieved media.

A third example embodiment takes the form of a non-transitory computer-readable medium containing instructions that, when executed by a processor, cause a set of steps to be carried out for submitting content to an electronic publish point. The set includes the steps of (i) receiving a selected newsroom script from a user via a user interface, (ii) retrieving, from a media source, media associated with the newsroom script, and (iii) submitting content to the publish point, where the content includes the retrieved media. Another example embodiment takes the form of a method comprising this set of steps.

A fourth example embodiment takes the form of a non-transitory computer-readable medium containing instructions that, when executed by a processor, cause a set of steps to be carried out for submitting content to an electronic publish point. The set includes the steps of (i) receiving a selected newsroom script from a user via a user interface, (ii) receiving content associated with the selected newsroom script, (iii) receiving a request to tag the newsroom script for auto-publishing; and (iv) responsive to a triggering event, submitting the received content to the publish point. Another example embodiment takes the form of a method comprising this set of steps.

BRIEF DESCRIPTION OF THE DRAWINGS

For a more complete understanding of the presently disclosed systems and methods, reference is now made to the following descriptions, taken in conjunction with the accompanying drawings in which.

DETAILED DESCRIPTION OF THE DRAWINGS

Figure 1:
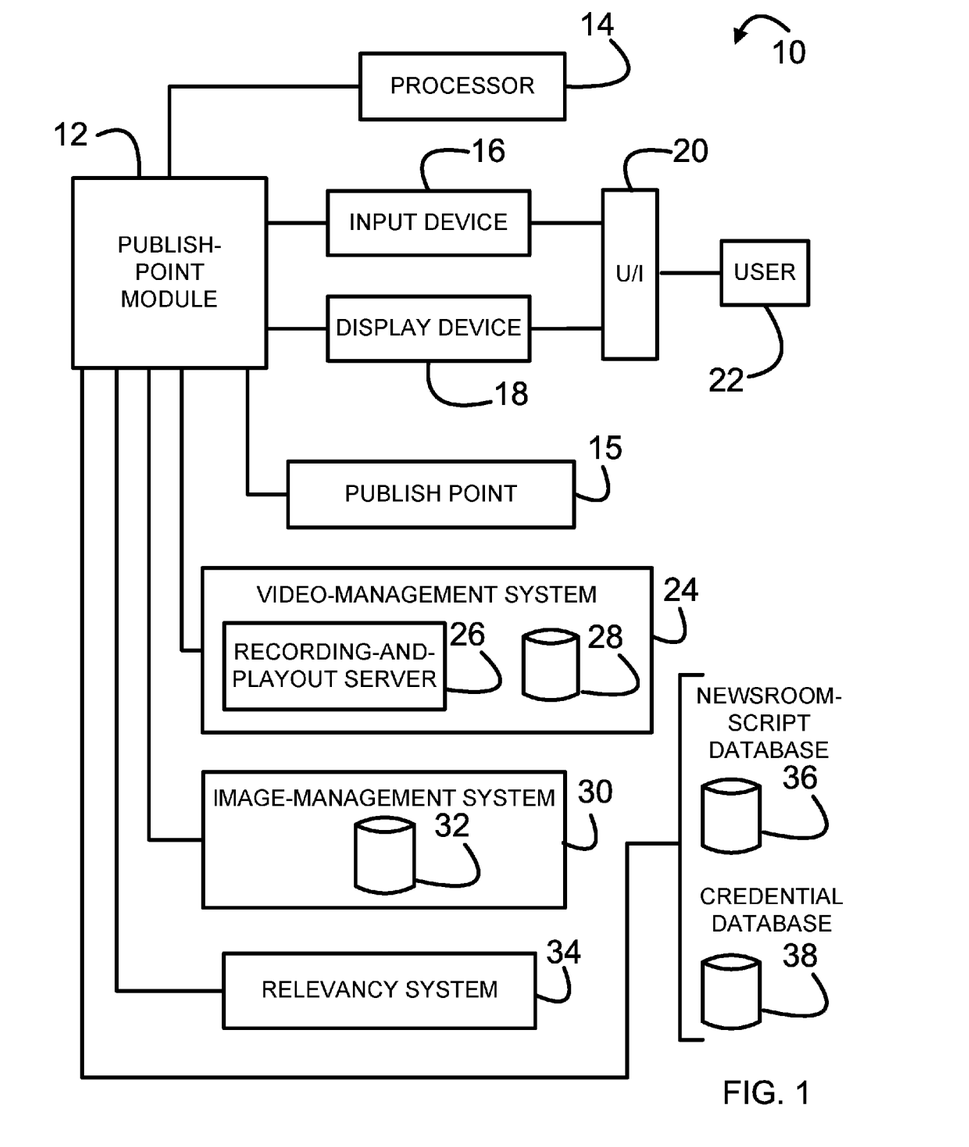
FIG. 1 is a block diagram illustrating an example of a system in accordance with at least one embodiment.

Turning now to FIG. 1, an example newsroom-management system 10 of the present invention is shown. Included in the newsroom-management system 10 is a publish-point module 12 implemented as a non-transitory computer-readable medium containing instructions that, when executed by a processor 14, cause performance of a set of steps for creating and submitting content to an electronic publish point 15. The newsroom-management system 10 further includes an input device 16, a display device 18, and a user interface 20 provided on the display device through which a user 22 (e.g., a producer) interacts with the publish-point module 12 and the entire newsroom-management system 10.

Further included in the newsroom-management system 10 is at least one media-management system having a media database. In at least one embodiment, one media-management system may be a video-management system 24 having one and perhaps a plurality of recording and playout servers 26 and a video-component database 28, and another media-management system may be an image-management system 30 having an image database 32. Finally, the newsroom-management system 10 includes a relevancy system 34, a newsroom-script database 36, and a publish-point login-credential database 38.

It is contemplated that some or all of the above-described systems and databases may be combined and/or otherwise organized as desired. Also, the organization of data within the described databases is not limited to any one particular technique. For example, the video-component database 28 may be organized by storing separate files for each video component. Alternatively, it may be organized by storing a video file together with a set of markers to identify a video component contained within the video file.

Turning now to FIGS. 2A-2D, a flow chart including steps of an example of a method embodiment of the present invention is shown. In step 200, a newsroom script is provided to a user via the user interface 20 associated with the newsroom-management system 10. A newsroom script includes a set of producer commands and/or on-air text, and is associated with a news program, and more particularly, is associated with a block of a news program. In a typical newsroom-management system, a news program is represented by a lineup (also referred to as a rundown) that includes a plurality of blocks separated by commercials. Blocks are identified by letter (e.g., Block A and Block B). Each block contains a plurality of newsroom scripts, with each script often being associated with a self-contained news story. Newsroom scripts are identified by number (e.g., Block A may have Script A-1 and Script A-2).

Figure 2A:
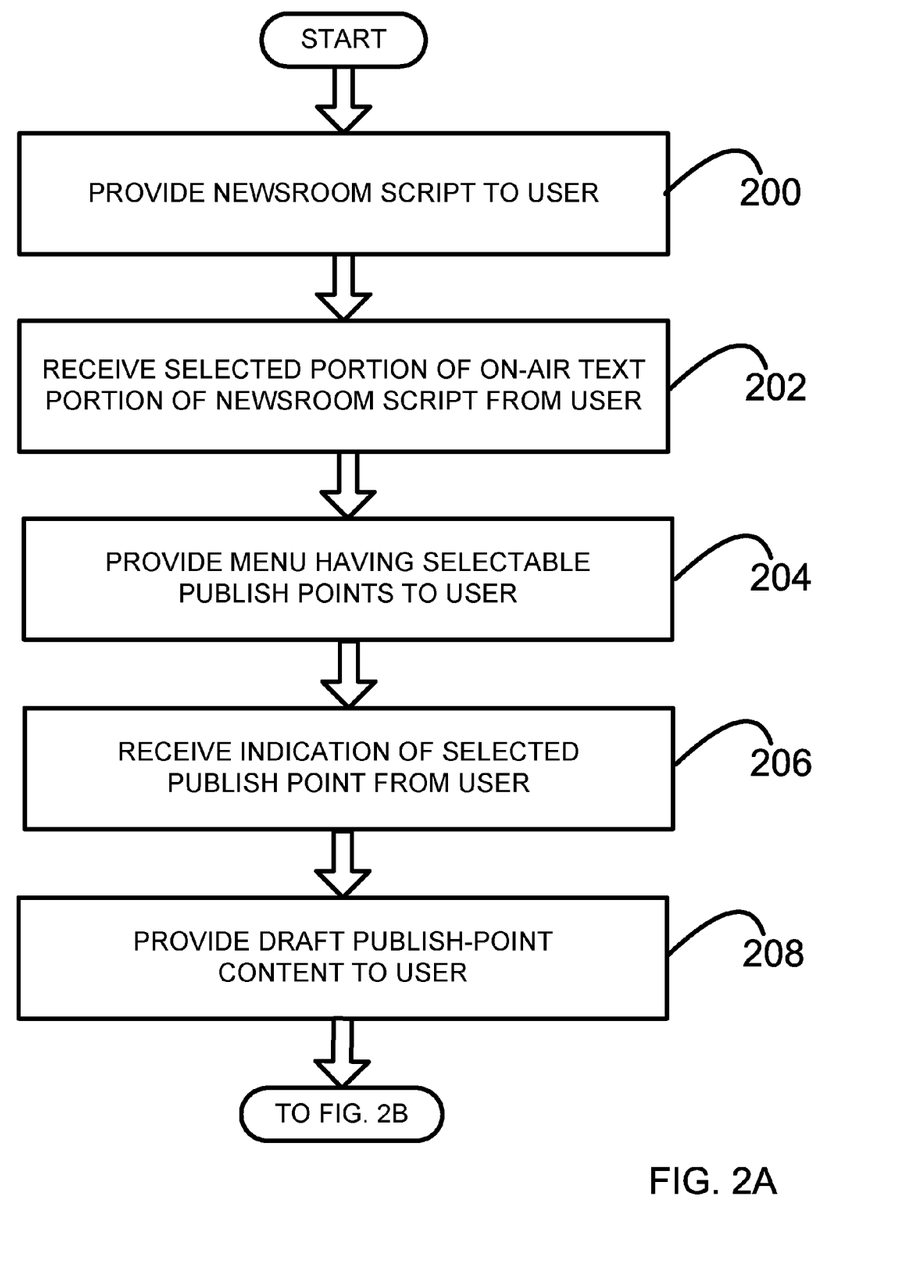
FIG. 2A is a first part of a flow chart illustrating steps of an example of a method in accordance with at least one embodiment.

The producer commands in each newsroom script are used to assist in the production of the news program (e.g., by specifying the lighting settings). The on-air text in each newsroom script is typically written by a producer and contains the actual text that is sent to a teleprompter and intended to be read aloud (e.g., by a news anchor) during a news program (i.e., to correspond to the news story associated with the newsroom script). Newsroom scripts are stored in the newsroom-script database 36, and contain references (e.g., pointers) to associated media (e.g., a video component stored in the video-component database 28 or an image stored in the image database 32).

Next, a user selects a portion of the on-air text included in the newsroom script that is desired to be included in the publish-point content (e.g., by highlighting the text using a mouse or other input device), such that in step 202, a selected portion (or at least an indication thereof) of the on-air text is received from the user. In step 204, a menu is provided to the user via the user interface 20 that includes a plurality of selectable publish points 15. The user then selects one or more publish points 15 to which the created content will be submitted such that in step 206, one or more selected publish points 15 are received from the user. In at least one embodiment, a check is also performed to ensure that the selected portion of the on-air newsroom script does not exceed the maximum number of characters permitted by any selected publish point 15. In the event that this occurs, a user may be notified and prompted to select another portion of text and/or edit the currently selected text. Alternatively, the text may be divided into two or more separate submissions, either automatically or upon a request from the user. In step 208, a menu is provided to the user with a draft of the content to be submitted to the publish point 15, including the selected portion of the on-air text.

In some embodiments, the provided text may be case corrected (since on-air text is often written in all upper case letters, which may not be desired in content submitted to a publish point 15). The user can then modify the selected portion of the on-air text, such that in step 210, a modified version of the selected portion of the on-air text is received from the user. Depending on the publish point 15, additional options, such as the inclusion of media (e.g., a video component or image) in the publish-point content may also be provided to the user. Retrieval of such media is described in greater detail below.

Among other things, the above-described technique provides an advantage over the traditional approach of creating publish-point content (e.g., by manually typing the text portion), in that it takes advantage of previously written on-air text to improve the accuracy of the text included in the publish-point content (e.g. the content will have improved accuracy as related to statements actually made on a news program that airs). Such accuracy, and therefore reliability improves the effectiveness of publish-point content in creating a connection with an end user (e.g., a consumer of social media). Due to the intended use of the on-air text (i.e., to literally be read aloud on the air), there is a preexisting need to ensure that the information contained therein is accurate and relevant to a given news story. This preexisting need is thereby leveraged to provide added benefits to previously unrelated activities, namely the creation and submission of content to a publish point 15.

Figure 2B:
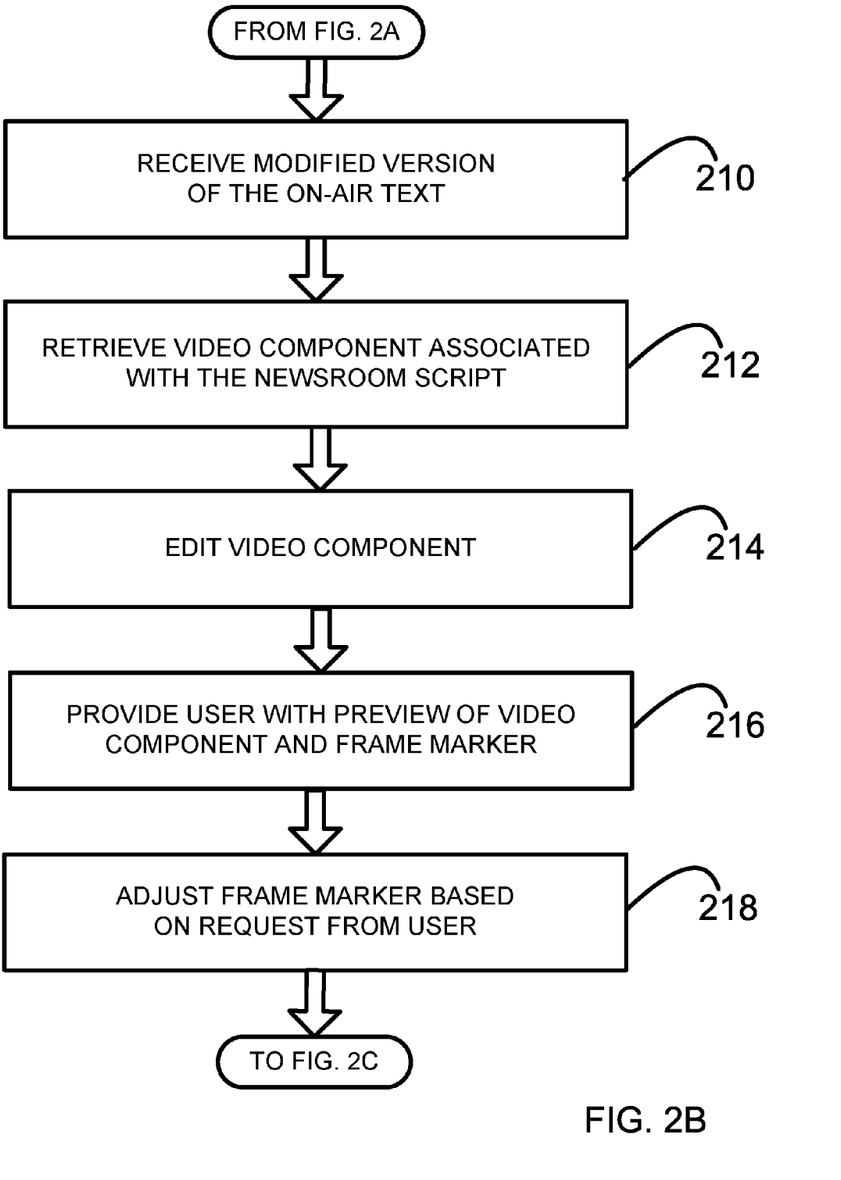
FIG. 2B is a second part of the flow chart of FIG. 2A.

Returning to the additional feature of retrieving media, in the event that a selected publish point 15 provides for the inclusion of video as part of, or in association with, submitted content, the user is given the opportunity to include a relevant video component as part of the submitted content. As such, in one embodiment, the video-component database newsroom-management system retrieved media is a video component associated with the newsroom script. In this embodiment, the newsroom-management system 10 includes and/or is tightly integrated with the video-management system 24, with each being specially configured to integrate with each other at an operational level such that they provide features that are not available in traditional newsroom-management systems, and particularly those related to the described publish-point features. Indeed, since newsroom scripts maintained in the newsroom-script database 36 include references (e.g., a MOS object reference) to video components in the video-component database 28, an associated video component for a given newsroom script can be retrieved and automatically included in content submitted to a publish point 15. As such, in step 212, a video component associated with the selected newsroom script (i.e., the script containing the on-air text selected by the user) is retrieved from the video management database 28. Moreover, since the video-management system 24 (and therefore the recording and playout server 26) is integrated into the newsroom-management system 10, in step 214, the retrieved video component can be edited directly in the newsroom-management system 10 (e.g., upon receiving editing requests from a user). For example, the user could request modifying the starting and ending positions to select a subset of the full video component before including it in the content for submission to a publish point 15.

Many publish points 15 also provide for the inclusion of an image as part of, or in association with, the submitted content. For example, select publish points 15 provide for the inclusion of an image that corresponds to an included video component (e.g., to be shown to the end user as a preview "icon" for the video component, also commonly known as a thumbnail image). Again, through tight integration with the video-management system 24, the user is provided with the opportunity to retrieve still images from the directly accessible video component for use as part of, and/or in association with, the content submitted to the publish point 15. To assist the user with selecting an image, in step 216, the user is provided with a preview of the video component and a frame marker via the user interface 20. In step 218, a position of the frame marker is adjusted based upon a request received from the user, and in step 220, an image of the video component is defined based on a frame associated with the frame marker.

The user may be further provided with options to move forward or backward some predefined number of frames to provide greater ease and more intuitive frame navigation. In at least one embodiment, the user has the option to move inclusively between 1-60, between 30-120, and between 60-9,000 frames per movement, and more particularly, the user may have the option to move 1, 30, or 1,800 frames per movement (notably, for video having a 30 frames per second frame rate, 30 frames represent 1 second of video and 1,800 frames represent 1 minute of video), with incrementally displaced frames being loaded from the video-component database each time the frame marker is moved (to reduce memory-retrieval time). However, these frame movement settings may be adjusted as desired (e.g., proportionally scaled for different frame rates).

Figure 2C:
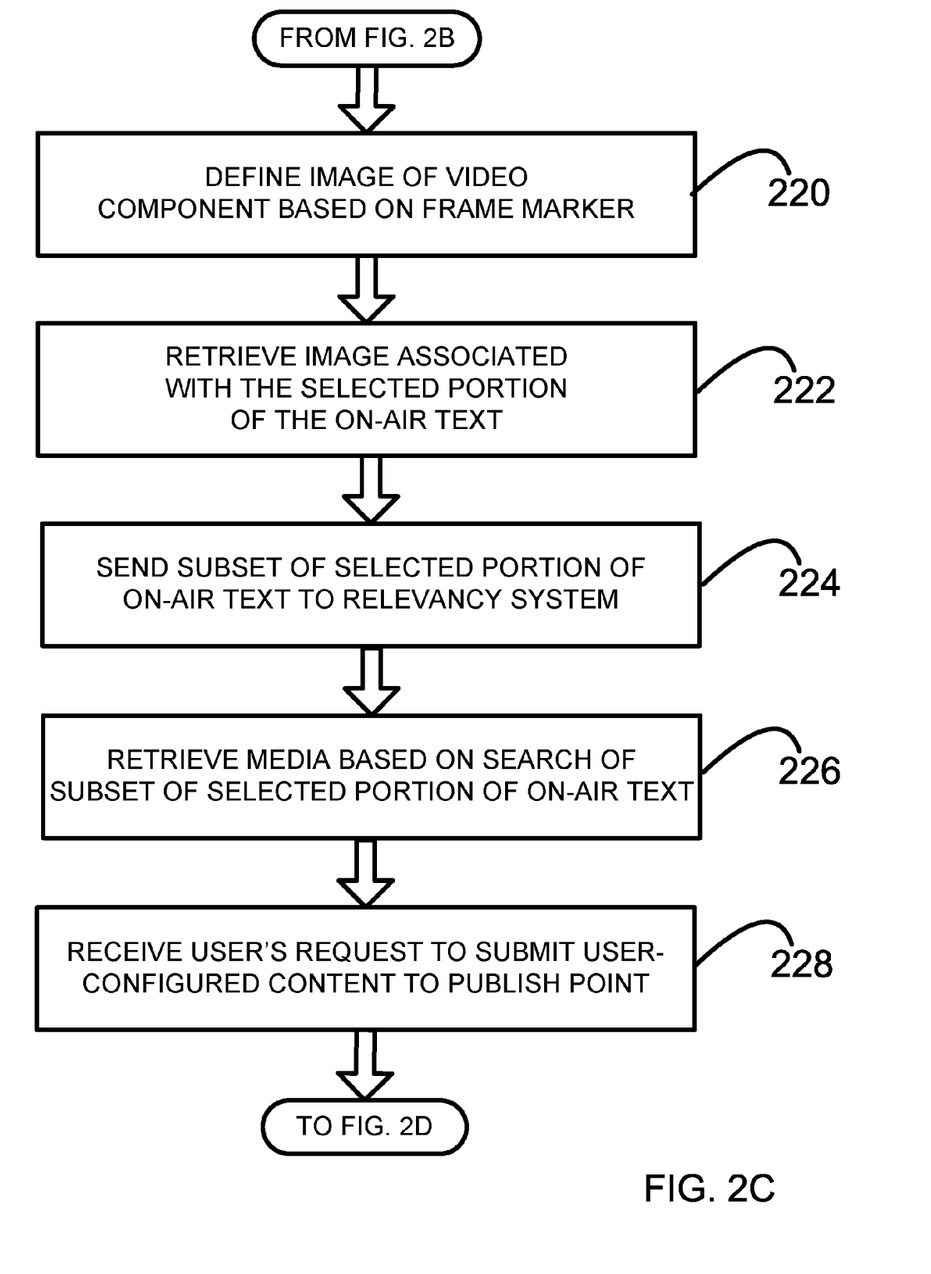
FIG. 2C is a second part of the flow chart of FIG. 2A.

In some embodiments, a default image for an associated video component may also be selected (e.g., based on the first frame of the associated video component). It may also be the case that the user is allowed to select from a list of generic images (e.g., when no video associated with the news story exists) or from another available source. As such, in one embodiment, the newsroom-management system 10, and the retrieved media is an image associated with the newsroom script. Similar to the steps described above with respect to retrieval of an associated video component, in step 222, an image associated with the newsroom script is retrieved from the image database 32.

It should be noted that in some embodiments, a user may retrieve a video component associated with the newsroom script simply to obtain an associated image (i.e., by using the frame selection technique described above), but may not include the video component itself in the content submitted to the publish point. Likewise, an image may be selected that is not associated with a particular video component, but that is otherwise desired to be included in the content submitted to the publish point.

In another embodiment, a user is provided with the opportunity to obtain publish-point content (e.g., an image, video or other media) from another source such as an email, website, database, etc., and is provided with a path destination window in which the user can select the media in the appropriate location.

Publish-point content may also be retrieved through use of a relevancy system. Using this technique, in step 224, a subset of the selected portion of the associated newsroom script is sent to the relevancy subsystem 34, and in step 226, media resulting from a search based on the subset of the selected portion of the on-air text is retrieved from a media database (which may be external, but accessible to the relevancy subsystem 34). In some embodiments, the subset of the selected portion of the on-air text is the entire selected portion. However, in other embodiment, filters may be applied to remove certain text (e.g., terms such as "a" and "the") from the selected portion before sending the request to the relevancy subsystem. In utilizing this technique, by a user's mere selection of a portion of an on-air text portion of a newsroom script, the relevancy system 34 returns a set of video components, images, or other media that can be selected by a user and included in the content submitted to a publish point.

In another embodiment, the publish-point content may include media associated with a newsroom script (e.g., based on a MOS object reference or on search results obtained from the relevancy system 34), but not an on-air text portion of the newsroom script. This allows a user to select a newsroom script generally (e.g., Script A) instead of selecting a portion of the associated on-air text, to create relevant publish-point content. In yet another embodiment, a selection of on-air text may be used solely to identify media sought to be submitted to a publish point. These embodiments allow a user to skip the step of modifying a selected portion of on-air text, thereby further streamlining the process of submitting content to a publish point 15 (i.e., without a text portion).

Figure 2D:
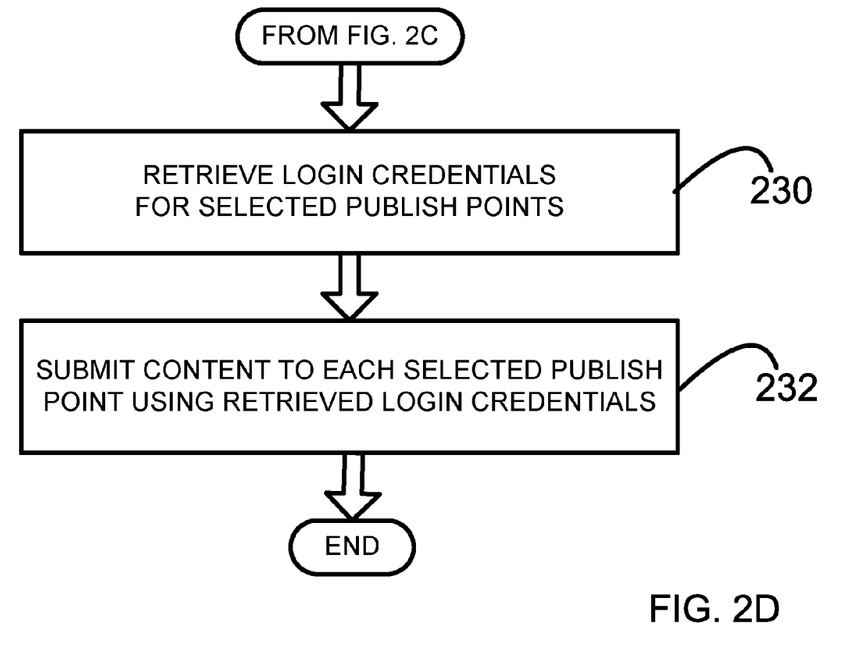
FIG. 2D is a second part of the flow chart of FIG. 2A.

In step 228, the user's request to submit the content as configured to a publish point 15 is received, in step 230, login credentials for each of the selected publish points are retrieved from the login credential database 38, and in step 232, the publish-point content is submitted to each selected publish point 15 using the retrieved corresponding login credentials. Use of such login credentials is particularly beneficial when users are submitting content to multiple publish points as individual users need not be given login credentials for each publish point. In some embodiments, login credentials may also include particular data required by the corresponding publish point 15 to permit for automatic submissions (i.e., by reducing or eliminating user intervention as described below).

The newsroom-management system 10 may also be configured such that it requires a master login to prevent unauthorized access to the associated publish points. Also, in submitting content to each publish point, an appropriate protocol such as an application programming interface is retrieved (e.g., from the login credential database 38) and followed such that the content can be submitted.

Typically, the protocol for a publish point 15 defines certain restrictions, such as what types of content can be submitted. Such restrictions may be leveraged to assist the user in selecting content for submission. For example, if one of the selected publish points does not accept video submissions, the user may be notified of the same and is restricted from selecting video (such as by disabling the option in the user interface 20).

In an alternative embodiment, a given newsroom script is associated with predefined publish-point content (e.g., defined at the time the newsroom script is created) and is tagged for auto-publishing. This technique is used to reduce or eliminate user intervention at or around the time the content is intended to be submitted to a publish point. For example, as a producer is drafting an on-air text portion of a newsroom script, the producer may select associated content (e.g., a portion of the on-air text portion or media associated with the newsroom script), designate it as appropriate content for submission to a publish point, and tag the newsroom script for auto-publishing. Thereafter, as the news program airs, the predefined content associated with the appropriate newsroom script is automatically submitted to the publish point. Preferably, the time at which the on-air text of the newsroom script is sent to a teleprompter is used to trigger the automatic submission of content to the publish point, but other timing mechanisms are also considered as triggering events (e.g., a timer alert).

It should further be noted that each of the content selection and login credential features discussed throughout this application are still applicable to this alternative embodiment. As such, the producer may predefine video, images, or other content (or rely on media obtained from the relevancy system 34) for automatic submission to one or more publish points using appropriate protocols and login credentials. Using this technique, select user intervention can be further reduced or eliminated, thereby providing an even greater ability to efficiently and accurately create and submit publish-point content that is relevant to an associated news program.

Notably, the present system and method may also be used in connection with a news program that is aired on the radio. In such embodiments, the newsroom script contains on-air text that is intended to be read aloud by a radio broadcaster during a news program and therefore the above-described techniques can be similarly applied. Notably, while a newsroom script that is used for radio does not contain a link or reference to a particular video component (since video is not supported by a radio broadcast), video components may still be obtained such as via use of the relevancy system 34 as described above.

It is noted that the described steps throughout this application need not be performed in the disclosed order. Further, the steps need not be performed sequentially, but can also be performed in parallel as desired. Further, not all steps need to be performed to achieve the desired goals of the present invention, and therefore not all steps are required.

Throughout this application, in some instances, steps may be defined by activity of the user. In these instances, such described steps should also be interpreted as describing the computer-readable medium and/or system hardware components as containing instructions that, when executed, take appropriate steps or provide appropriate output requesting the user to perform such steps and/or instructions for receiving the user's input and proceeding accordingly.

Although the present invention has been described in terms of certain embodiments and generally associated methods, alterations, combinations, and permutations of these embodiments and methods will be apparent to those skilled in the art. Accordingly, the above description of example embodiments does not define or constrain the present invention.

Other changes, substitutions, and alterations are also possible without departing from the invention in its broader aspects as set forth in the following claims.

The invention claimed is:

1. A non-transitory computer-readable medium containing instructions that, when executed by a processor, cause a set of steps to be carried out for submitting content to an electronic publish point, the set comprising:
providing a newsroom script to a user via a user interface;
receiving an indication of a selected portion of an on-air text portion of the newsroom script from the user via the user interface;
retrieving, from a media database, media associated with the newsroom script; and
submitting content to the publish point, wherein the content comprises text associated with the selected portion of the on-air text portion, and wherein the content further comprises the retrieved media.

2. The computer-readable medium of claim 1, the set further comprising:
providing a plurality of selectable publish points to the user via the user interface; and
receiving an indication of a publish point selected by the user,
wherein submitting content to the publish point comprises submitting content to the selected publish point.

3. The computer-readable medium of claim 1, wherein the text associated with the selected portion of the on-air text portion comprises the selected portion of the on-air text portion.

4. The computer-readable medium of claim 1, the set further comprising:
receiving a modified version of the selected portion of the on-air text portion from the user, wherein the text associated with the selected portion of the on-air text portion comprises the received modified version of the selected portion of the on-air text portion.

5. The computer-readable medium of claim 1, wherein the media database comprises a video-component database and the media comprises a video component.

6. The computer-readable medium of claim 5, the set further comprising:
providing the user with a preview of the video component and a frame marker via the user interface;
adjusting a position of the frame marker in response to a request received from the user; and
defining a thumbnail image of the video component based on a frame associated with the frame marker,
wherein the content further comprises the thumbnail image.

7. The computer-readable medium of claim 6, wherein the frame marker moves in increments of one of 1, 30, and 1800 frames, the set further comprising loading displaced frames of the video component according to the increments in response to the frame marker being moved by the user.

8. The computer-readable medium of claim 5, the set further comprising:
defining a thumbnail image based on a first frame of the video component, wherein the content further comprises the thumbnail image.

9. The computer-readable medium of claim 1, the set further comprising:
retrieving, from a credential database, login credentials for the publish point, wherein submitting the content to the publish point comprises submitting the content to the publish point using the retrieved login credentials.

10. The computer-readable medium of claim 1, wherein the publish point comprises a social-media publish point.

11. The computer-readable medium of claim 1, wherein the user interface comprises a display device and an input device.

12. The computer-readable medium of claim 1, wherein the media database is an image database, and wherein the media is an image.

13. The computer-readable medium of claim 1, the set further comprising:
sending to a relevancy subsystem, a subset of the selected portion of the on-air text portion,
wherein retrieving from a media database, media associated with the newsroom script, comprises retrieving media from the relevancy subsystem based on the subset of the selected portion of the on-air text portion.

14. A computer-implemented method comprising:
a processor-based computing system providing a newsroom script to a user via a user interface;
the processor-based computing system receiving an indication of a selected portion of an on-air text portion of the newsroom script from the user via the user interface;
the processor-based computing system retrieving, from a media database, media associated with the newsroom script; and
the processor-based computing system submitting content to an electronic publish point, wherein the content comprises text associated with the selected portion of the on-air text portion, and wherein the content further comprises the retrieved media.

15. The method of claim 14, further comprising:
the processor-based computing system receiving an indication of a publish point selected by the user from a plurality of selectable publish points,
wherein submitting content to the publish point comprises submitting content to the selected publish point.

16. The method of claim 15, further comprising:
the processor-based computing system providing the plurality of selectable publish points to the user via the user interface.

17. The method of claim 14, wherein the media comprises a video component.

18. The method of claim 17, further comprising:
the processor-based computing system providing the user with a preview of the video component and a frame marker via the user interface;
the processor-based computing system adjusting a position of the frame marker in response to a request received from the user; and
the processor-based computing system defining a thumbnail image of the video component based on a frame associated with the frame marker, wherein the content further comprises the thumbnail image.

19. The method of claim 14, wherein the publish point comprises a social-media publish point.

20. A processor-based computing system comprising a user-interface and configured for performing a set of steps comprising:
- providing a newsroom script to a user via the user interface;
- receiving an indication of a selected portion of an on-air text portion of the newsroom script from the user via the user interface;
- retrieving, from a media database, media associated with the newsroom script; and
- submitting content to an electronic publish point, wherein the content comprises text associated with the selected portion of the on-air text portion, and wherein the content further comprises the retrieved media.

* * * * *